INVENTORS
HARVEY RUBINSTEIN
EDMUND U. COHLER
BY
Stanley M. Sel[illegible]
ATTORNEY July 1, 1969 E. U. COHLER ET AL 3,453,607

DIGITAL COMMUNICATIONS SYSTEM FOR REDUCING THE NUMBER OF MEMORY CYCLES

Filed Oct. 24, 1965 Sheet 2 of 2

INVENTORS
HARVEY RUBINSTEIN
EDMUND U. COHLER

BY Stanley M. Schurgin

ATTORNEY

United States Patent Office 3,453,607

Patented July 1, 1969

3,453,607

DIGITAL COMMUNICATIONS SYSTEM FOR REDUCING THE NUMBER OF MEMORY CYCLES

Edmund U. Cohler, Brookline, and Harvey Rubinstein, Lynnfield, Mass., assignors to Sylvania Electric Products Inc., a corporation of Delaware Filed Oct. 24, 1965, Ser. No. 504,963

Int. Cl. G06f *9/10;* G11c *11/06*

U.S. Cl. 340—174 5 Claims

ABSTRACT OF THE DISCLOSURE

A digital communication system having input information lines connected directly to individual cores of a main computer memory. By supplying a synchronization bit concurrent with an information bit, the computer acts in a single memory cycle to assemble information bits into a character, determines that a full character has arrived, and updates the parity of the character.

This invention relates generally to digital systems and more particularly to a new technique for providing an interface between digital processors and serial-by-bit input/output data transmission lines.

In many systems, such as message center switching systems, telemetry systems under stored program control, or store and forward systems, data on incoming transmission lines arrives at the system processor in so-called serial-by-bit form, that is, with the bits of a word arriving serially. The arriving bits are assembled into characters and messages, stored in the system memory and the assembled characters and messages sent out on appropriate output transmission lines, as required. The most frequent operations in such systems are the acceptance and delivery of bits of information. In conventional systems, buffering equipment is usually required between the input transmission lines and the digital processor and special control instructions are required to govern the initial processing of data arriving on these input lines. Because of such special instructions, a number of memory cycles are needed to process each incoming information bit. Some systems have been suggested which reduce the number of memory cycles required to process an information bit; however, the increased speed has been at the expense of additional equipment to control the bit processing.

It is, therefore, the object of the present invention to provide an interface between the transmission lines and the processor which allows a reduction in the number of memory cycles conventionally required to process an incoming bit without the necessity of additional control equipment.

In accordance with the present invention, each of the information lines is connected directly to a core of the main computer memory. In addition, a synchronization line for each input information line is brought into the memory in a similar fashion to indicate the presence or absence of an information bit. With the data and synchronization bits available in the memory, the computer then acts in a single memory cycle to assemble a bit into a character, tests to see if a full character has arrived, and updates the parity of the character. These operations are accomplished, as are the control and timing functions, almost entirely with equipment which usually exists in the computer. As a result, the amount of time which the computer must spend in accepting and assembling an entire character is now less than that which was formerly required just to take in a single bit.

The invention will be more fully understood from the following detailed description, taken in conjunction with the accompanying drawings in which.

Figure 1:
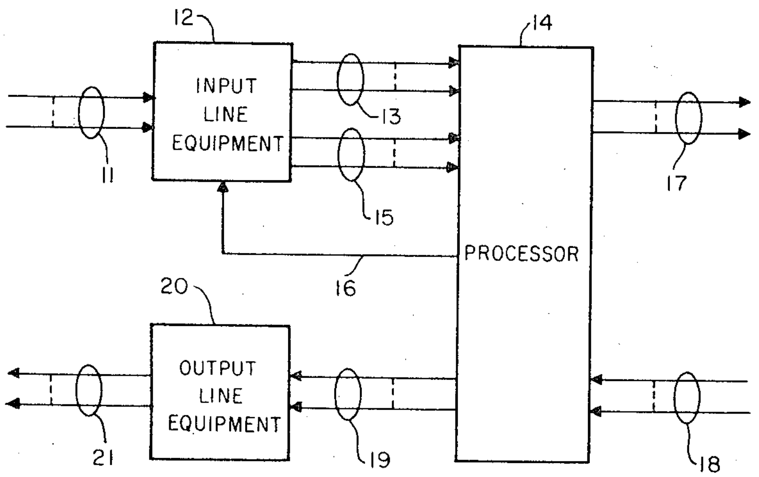
FIG. 1 is a partial block diagram of a message switching center.

Referring to FIG. 1, there is shown a multiplicity of input transmission lines 11 connected to the input line equipment 12 which performs the functions of reshaping the input information bits and providing a synchronization pulse for each information bit. A multiplicity of information lines 13 is provided between the input line equipment 12 and the processor 14 of the message switching center, with a like multiplicity of synchronization bit lines 15 connected between the input line equipment 12 and the processor 14 of the message switching system. A line 16 transmits synchronized write pulse timing bits from the processor to the input line equipment to provide the aforementioned synchronization. A plurality of lines 17 provides interconnections between the processor and other major subsystems of the message switching center, and another group of lines 18 returns the processed information from the other major subsystems of the message switching center to the processor 14. A group of lines 19 is connected between processor 14 and output line equipment 20, with a group of output transmission lines 21 connected from the output line equipment 20 to the utilization circuitry.

Figure 2:
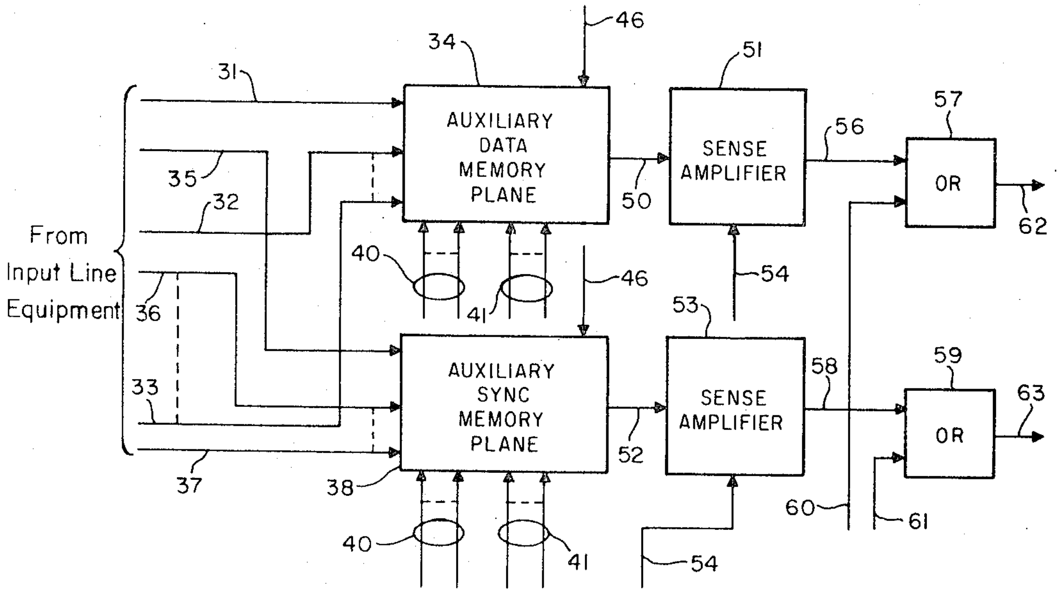
FIG. 2 is a block diagram of the input line interface with a digital processor.

Referring now to FIG. 2, there is illustrated the basic system of entry into the memory of the processor of the message switching system. For purposes of illustration, it is assumed that the processor memory is of the magnetic core type, although it will be readily apparent to those skilled in the art that the magnetic core memory may be replaced by other memory systems, such as thin magnetic films. Each of the incoming data lines 31, 32 and 33 is connected to a respective core in an auxiliary data memory plane 34 which is effectively a part of the main memory of the processor. In similar fashion, each of the incoming synchronization lines 35, 36 and 37 is connected to a respective core in an auxiliary synchronization memory plane 38 which is effectively a part of the main memory of the processor.

The auxiliary memory planes 34 and 38 are wired to the main memory via the X and Y lines 40 and 41, except that the X and Y lines have "read only" capability, that is, it is not possible for write pulses to enter the auxiliary memory planes on the X and Y lines. During the write half-cycle of the main memory, a ½ write current pulse is applied from the main memory via line 46 which threads each of the cores in the auxiliary memory planes thereby providing a ½ write connection common to all cores. A sense winding output 50 from auxiliary memory plane 34 is connected to a sense amplifier 51, and in similar fashion the sense winding output 52 from memory plane 38 is connected to a sense amplifier 53. Strobe pulses to sense amplifiers 51 and 53 are provided from the main memory circuits of the processor via line 54, while the outputs 56 and 58 of the sense amplifiers 51 and 53 are connected to respective OR circuits 57 and 59. Also connected to OR circuits 57 and 59 are the respective sense windings 60 and 61 from the memory planes associated with auxiliary memory planes 34 and 38. The outputs 62 and 63 of OR circuits 57 and 59 are connected to the memory register of the processor.

To describe the operation of the interface network of FIG. 2, it is assumed that an information bit is incoming on data line 31. The incoming bit pulse is equivalent to a half-write current pulse for the processor memory. In similar fashion the incoming synchronization pulse on line 35 is a half-write current pulse for the memory processor. As described above, the incoming synchronization pulse on line 35 is timed with the write cycle of the processor memory, with the result that the half-write pulses on lines 31 and 35 are applied to the respective cores terminating these lines, in the auxiliary memory planes 34 and 38. At the same time, the half-write current pulse on line 46 from the main memory is passed through each core in the auxiliary memory planes. Thus the half-write current pulse from the main memory is coincident with the half-write data and synchronization pulses from the incoming lines, resulting in the writing of a ONE into the memory cores where the coincidence occurs. In this case ONES are written into the memory cores associated with incoming lines 31 and 35. The information bits now placed in the memory are read out of the cores by the standard read cycle of the memory. Thus, once having been written into memory, a data bit is available for readout with the rest of the word in the respective memory locations using the standard memory equipment available in the processor.

Figure 3:
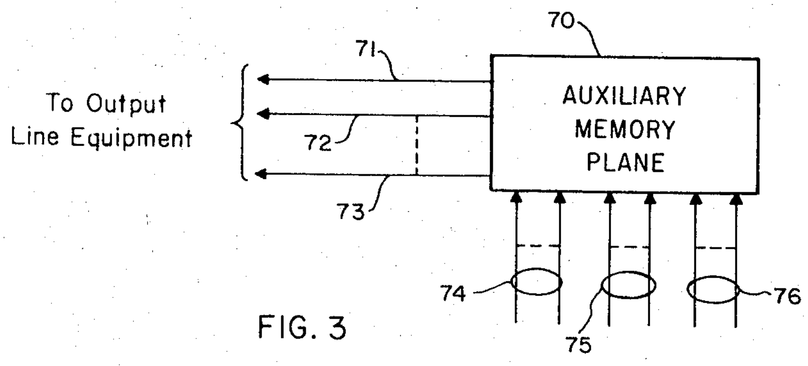
FIG. 3 is a block diagram of the output line interface with a digital processor.

The system for transferring information bits from the processor to the outgoing transmission line is illustrated in FIG. 3. This system consists of an auxiliary memory plane 70 which is effectively a part of the main memory of the processor. The groups of X, Y and Z lines 74, 75 and 76, from the main memory of the processor are wired into the auxiliary memory plane 70 in the same manner as they are wired into the main memory. However, the auxiliary memory plane does not contain a sense winding, but instead each of the outgoing data lines, such as lines 71, 72 and 73, is connected to a respective core in the auxiliary memory plane 70. To deliver an information bit to the outgoing transmission lines, the information bit is first written into the auxiliary memory plane 70 by applying half-write signals to the appropriate X and Y windings of the auxiliary memory plane. This is accomplished as part of the process of writing into the main memory address the character to be transmitted of which the bit in the auxiliary memory is a part. The information bit is read out to the outgoing transmission line by applying half read pulses to the repsective X and Y windings, thereby inducing a signal onto the outgoing transmission line.

Figure 4:
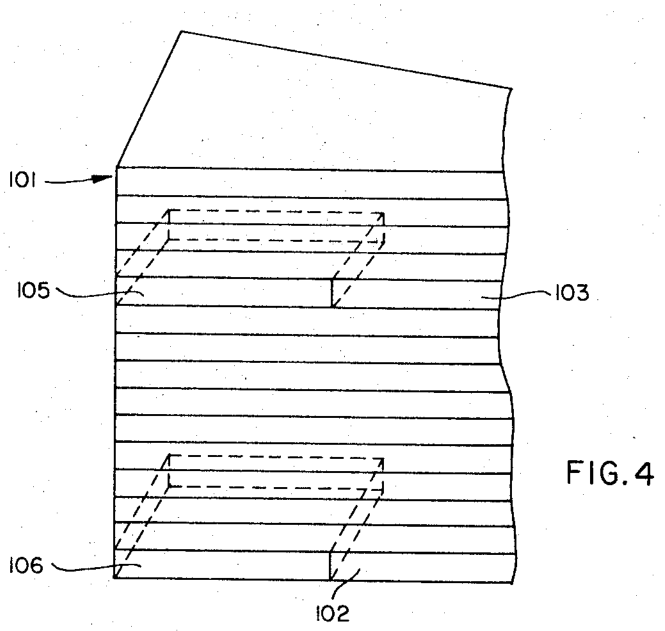
FIG. 4 is a diagrammatic representation of the memory structure of a processor according to the invention.

Referring next to FIG. 4, there is shown a sectional view of a main memory 101 of a processor. The memory consists of a stack of memory planes corresponding to bit positions of words in the memory. The auxiliary memory planes described in FIG. 2 and FIG. 3 are essentially parts of memory planes in the main memory. For example, the auxiliary memory plane 38 described in conjunction with FIG. 2 is contained in section 105 of memory plane 103, and the auxiliary memory planes 34 of FIG. 2 and 70 of FIG. 3 are contained in section 106 of memory plane 102. Thus, the data bits contained in auxiliary memory planes 34, 38 and 70 correspond to bits of a memory word, and the relative position of these bits remains the same.

Figure 5:
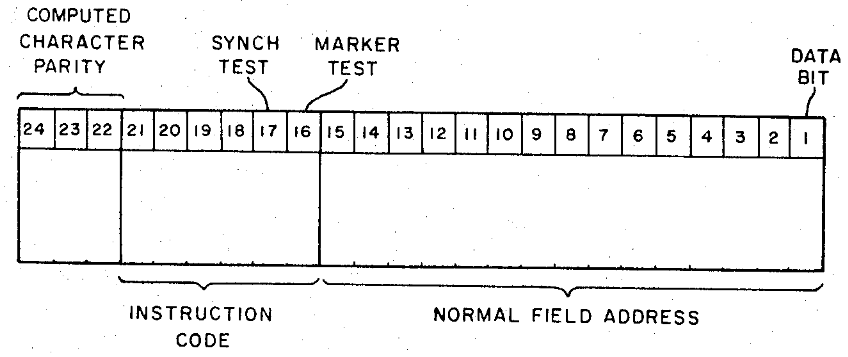
FIG. 5 is a diagram of a typical instruction word format for bit processing according to the invention.

The instruction illustrated in FIG. 5 is typical of the bit processing format which may be used to practice the invention. In this format the first fifteen bits of the instruction constitute the normal field address, the 16th through 21st bits constitute the instruction code and the 22nd through 24th bits indicate the computed character parity. The first bit of the instruction word is always the incoming or outgoing data bit. In addition, a marker bit is necessary to process an incoming character, and the sixteenth and seventeenth positions of the instruction word are used for marker test and sync test, respectively. To describe the utilization of such an instruction format in processing incoming information bits according to the invention, assume that the instruction code is as follows:

| INSTRUCTION CODE: | INSTRUCTION EFFECT |
|---|---|
| 0 1 0 1 X X | Check sync and marker. |
| 0 1 0 1 1 0 | Shift bits 1-16 left; clear bit 17 and restore. (Positions data bit.) Update parity. |
| 0 1 0 1 0 0 | No operation. |

The instruction code part of the instruction word contains a partial code and two externally set bits. The address field part of the instruction word contains the partially assembled character and marker bit. When the scan program causes this instruction to be read out from the memory, the operation which is executed depends upon the two indeterminate bits. Initially, assume that the second indeterminate bit, the bit in the sixteenth position, is a logical zero. The first indeterminate bit, the bit in the seventeenth position, which is the sync bit is a logical one if a new data pulse has come in since the line was last scanned. The full instruction code is then 0 1 0 1 1 0, which according to the above instruction format causes the processor to perform a shift operation upon the field address portion of the word. The data bit which was in the last significant bit of the word is thereby shifted left one position and is entered into the partly assembled character. Simultaneously, the character parity is updated and in addition, the synchronization bit is cleared and the entire word is restored by the processor in the same memory location. If, however, the line word contained an instruction code 0 1 0 1 0 0, indicating that no sync bit had come in, it would be interpreted as a "no-op" and the word is restored without modification.

The marker bit, which for eight bit characters is a logical one initially placed in the eighth bit position, is used to indicate the presence of a complete character. Each time a shift-left operation is performed on the normal field address, the marker bit is shifted one position to the left until such time as it is shifted into the sixteenth bit position. When a logical one appears in the sixteenth position, this indicates that a complete character has been assembled and the instruction code indicates a branch instruction which transfers the assembled character to a new memory location for further character processing.

An instruction word format to process outgoing information bits is similar to the above-described instruction word format for processing incoming information bits, except that the shift operation will be reversed, that is, shifting will be from left to right. Furthermore, in the processing of outgoing information bits no sync pulse or sync test is required since the processor is providing its own synchronization.

The invention is not to be limited by what has been particularly shown and described, except as indicated in the appended claims.

What is claimed is:

1. A message switching system for processing serial-by-bit data comprising:

- a data processor;
- a memory operatively associated with said data processor, said memory having a multiplicity of memory planes;
- a first auxiliary memory plane associated with one of said memory planes;
- a second auxiliary memory plane associated with a second one of said memory planes;
- first and second pluralities of input lines connected directly to the respective said first and second auxiliary memory planes;
- a plurality of output lines connected directly to said second auxiliary memory plane; and
- means for providing synchronization signals from said processor to said second plurality of input lines whereby the presence of a synchronization pulse on one of said second plurality of input lines indicates the presence of a data pulse on the respective one of said first plurality of input lines.

2. The system according to claim 1 in which said memory is a magnetic core memory and wherein the section of said memory containing said auxiliary memory planes is structured to provide memory word formats having:
- a first plurality of bit positions providing a field address portion of the memory word;
- a second plurality of bit positions providing an instruction code address of the memory word; and
- a third plurality of bit positions providing a parity address for the memory word.

3. The system according to claim 1 in which said first auxiliary memory plane includes:
- a first portion in which a pair of coordinate conductors from the memory plane pass respectively through each bit location, said pair of coordinate conductors operative to provide read-only pulses, and a first conductor from said processor passing through each bit location operative to provide half-write pulses; and
- a second portion in which a pair of coordinate conductors from the memory plane pass respectively through each bit location, said pair of coordinate conductors operative to provide read and write pulses.

4. The system according to claim 3, in which said second auxiliary memory plane includes:

- a pair of coordinate conductors from the memory plane passing respectively through each bit location, said pair of coordinate conductors operative to provide read-only pulses; and
- a first conductor from said processor passing through each bit location and operative to provide half-write pulses.

5. The invention according to claim 4 in which said memory is a magnetic core memory and each of said bit locations is a magnetic core.

References Cited

UNITED STATES PATENTS

| | | | |
|---|---|---|---|
| 2,991,454 | 7/1961 | Hammer | 340—172.5 |
| 3,108,257 | 10/1063 | Buchholz | 340—172.5 |
| 3,136,980 | 6/1964 | Matthews | 340—172.5 |
| 3,157,860 | 11/1964 | Batley | 340—174 |
| 3,164,810 | 1/1965 | Harding | 340—174 |
| 3,172,087 | 3/1965 | Durgin | 340—174 |

STANLEY M. URYNOWICZ, Jr., *Primary Examiner.*

U.S. Cl. X.R.

340—172.5